(12) United States Patent
Noto

(10) Patent No.: US 11,033,154 B2
(45) Date of Patent: Jun. 15, 2021

(54) SERVING PLATTER SYSTEM WITH A JUICE GROOVE AND END NOTCHES FOR GRILL TO TABLE CONVENIENCE

(71) Applicant: Kristin Noto, Atherton, CA (US)

(72) Inventor: Kristin Noto, Atherton, CA (US)

(*) Notice: Subject to any disclaimer, the term of this patent is extended or adjusted under 35 U.S.C. 154(b) by 225 days.

(21) Appl. No.: 16/429,832

(22) Filed: Jun. 3, 2019

(65) Prior Publication Data

US 2020/0205617 A1    Jul. 2, 2020

Related U.S. Application Data

(63) Continuation-in-part of application No. 16/237,436, filed on Dec. 31, 2018, now Pat. No. 10,413,105.

(51) Int. Cl.
A47J 47/00    (2006.01)
A47G 23/06    (2006.01)

(52) U.S. Cl.
CPC ............ *A47J 47/005* (2013.01); *A47G 23/06* (2013.01)

(58) Field of Classification Search
CPC ......... A47J 57/00; A47J 47/005; A47G 23/00; A47G 23/06
See application file for complete search history.

(56) References Cited

U.S. PATENT DOCUMENTS

| | | |
|---|---|---|
| 2,511,648 A | 6/1950 | Milholland |
| 4,757,937 A | 7/1988 | Maio et al. |
| 4,863,094 A | 9/1989 | Morrow et al. |
| 5,305,544 A | 4/1994 | Testa |
| 5,337,911 A | 8/1994 | Holub |
| D389,012 S | 1/1998 | Miller |
| 5,850,956 A | 12/1998 | Hayward, Jr. |
| D412,265 S | 7/1999 | Hall |
| 6,386,531 B1 | 5/2002 | Prosser |
| 6,722,644 B1 | 4/2004 | Prosser |
| D514,439 S | 2/2006 | Snedden et al. |
| 6,994,334 B2 | 2/2006 | Jones et al. |
| D521,812 S | 5/2006 | Kim |
| 7,040,611 B2 | 5/2006 | Poynton |
| 7,806,305 B1 | 10/2010 | Moore, Jr. et al. |
| D641,598 S | 7/2011 | Hashim |
| D642,049 S | 7/2011 | Samartgis |
| 8,167,129 B2 | 5/2012 | Hatcher |
| D698,199 S | 1/2014 | Yessin et al. |
| 9,095,237 B2 | 8/2015 | Khuu |
| 10,188,090 B2 | 1/2019 | Brewer |
| 10,413,105 B1 | 9/2019 | Noto |
| 2007/0278126 A1 | 12/2007 | Hatcher |

(Continued)

OTHER PUBLICATIONS

International Search Report and Written Opinion dated Feb. 28, 2020 for International Application No. PCT/US19/65877, 10 pages.

*Primary Examiner* — Lee D Wilson
(74) *Attorney, Agent, or Firm* — Perkins Coie LLP

(57) ABSTRACT

Serving platter systems for grill to table convenience are disclosed herein. Various embodiments include a platter including a dorsal plater surface and a cutting board including a ventral cutting board surface. In some embodiments the ventral cutting board surface seamlessly engages with the dorsal platter surface to form the serving platter system for grill to table convenience. In various embodiments the dorsal cutting board surface further comprises an indentation for trapping juices from grilled food items. Furthermore, the dorsal platter surface comprises a fluid receiving indentation section of the dorsal platter surface for receiving juices from grilled food items.

24 Claims, 11 Drawing Sheets

(56) References Cited

U.S. PATENT DOCUMENTS

| | | |
|---|---|---|
| 2009/0146353 A1 | 6/2009 | Hashim |
| 2009/0200723 A1 | 8/2009 | Lim et al. |
| 2013/0049275 A1 | 2/2013 | Morgan |
| 2014/0138893 A1 | 5/2014 | Khuu |
| 2015/0230666 A1 | 8/2015 | Mackelvie |
| 2016/0045076 A1 | 2/2016 | De Groote |

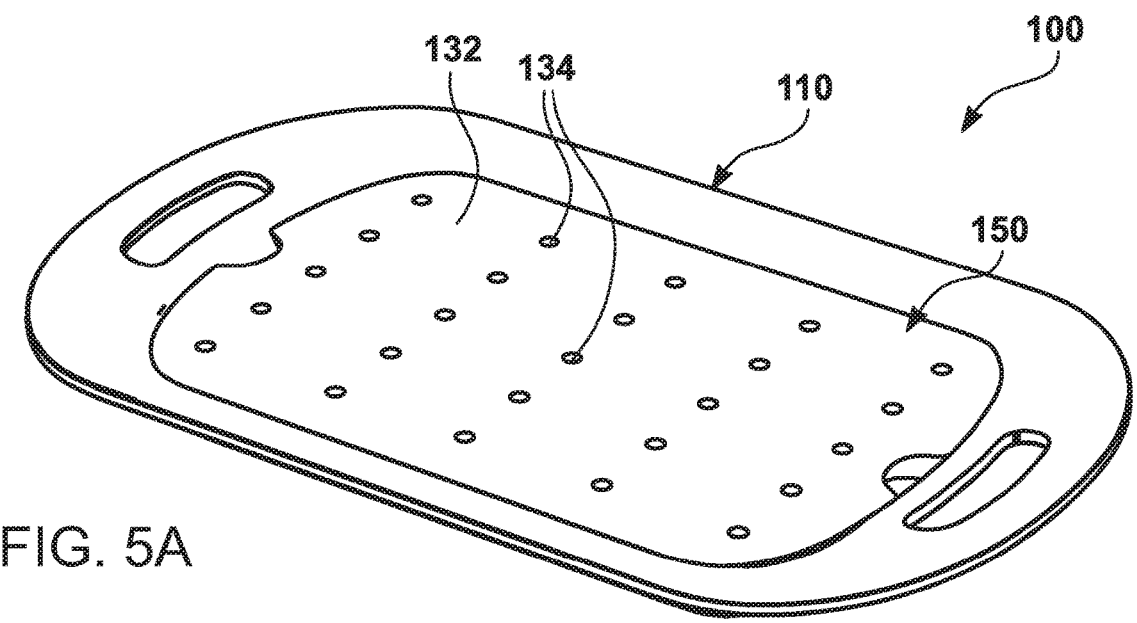
FIG. 5A
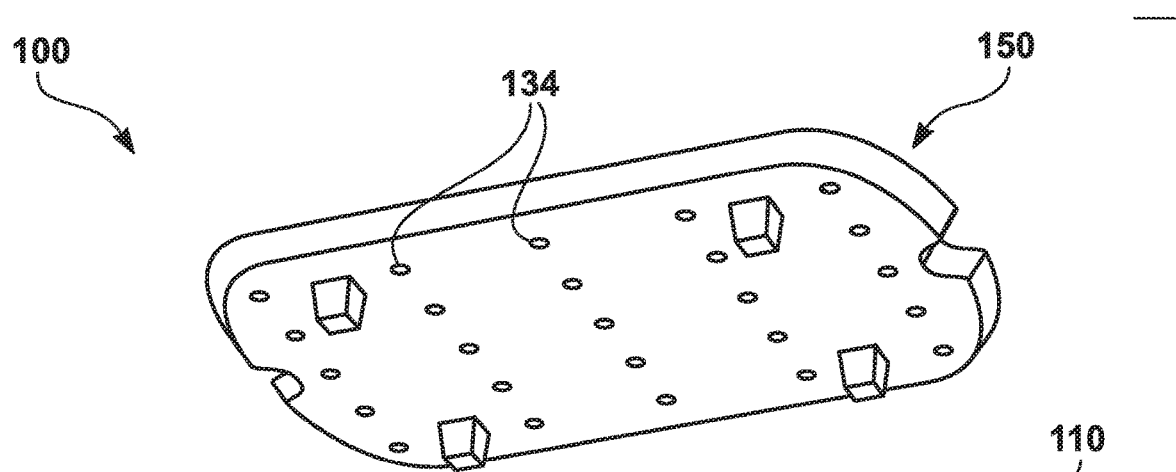
FIG. 5B
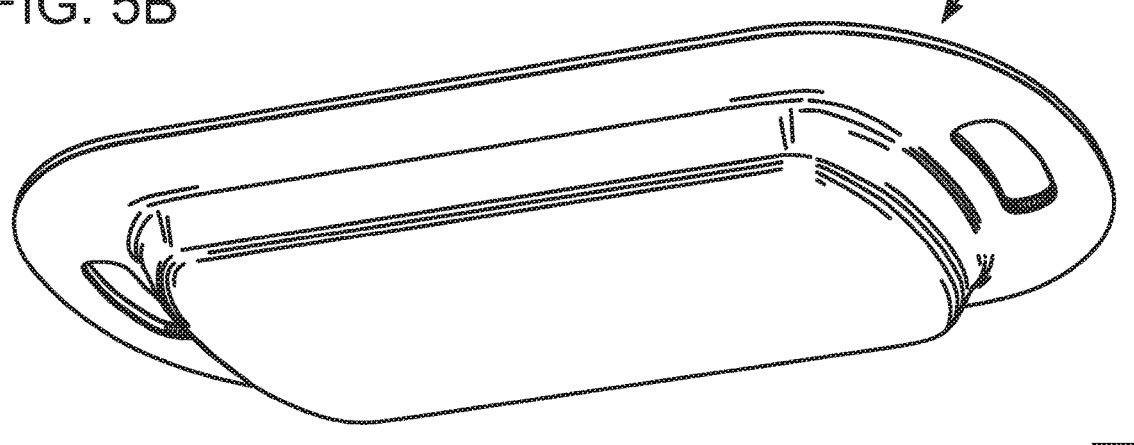

SERVING PLATTER SYSTEM WITH A JUICE GROOVE AND END NOTCHES FOR GRILL TO TABLE CONVENIENCE

CROSS-REFERENCE TO RELATED APPLICATIONS

This U.S. Utility Patent Application is a continuation-in-part of U.S. Utility patent application Ser. No. 16/237,436, filed Dec. 31, 2018, titled "Serving Platter System for Grill to Table Convenience," and is related to U.S. Design patent application Ser. No. 29/675,377, filed Dec. 31, 2018, titled "Serving Platter System for Grill to Table Convenience," all of the aforementioned disclosures are hereby incorporated by reference herein in their entireties including all references cited therein.

FIELD OF TECHNOLOGY

Embodiments of the present disclosure are directed to a serving platter system, and more particularly, a serving platter system for grill to table convenience. In various embodiments the serving platter system includes a platter and a cutting board for cutting and serving grilled food items.

SUMMARY

According to some embodiments, the present technology is directed to a serving platter system for grill to table convenience. The serving platter system comprise: a platter, comprising: a dorsal platter surface, the dorsal platter surface comprising: a first platter lateral side; a second platter lateral side, the first platter lateral side and the second platter lateral side being congruent; a first platter end section; a second platter end section, the first platter end section and the second platter end section being congruent; a ventral platter surface. The serving platter system for grill to table convenience further comprise a cutting board, comprising: a dorsal cutting board surface, comprising: a first cutting board lateral side; a second cutting board lateral side, the first cutting board lateral side and the second cutting board lateral side being congruent; a first cutting board end section; a second cutting board end section, the first cutting board end section and the second cutting board end section being congruent; and a ventral cutting board surface, the ventral cutting board surface seamlessly engaging with the dorsal platter surface to form the serving platter system for grill to table convenience.

In various embodiments the dorsal platter surface further comprises a platter lip, the platter lip surrounding the first platter lateral side, the second platter lateral side, the first platter end section, and the second platter end section.

In some embodiments the first platter end section and the second platter end section further comprise a first handle and a second handle, the first handle being a first grip in the platter lip of the first platter end section, and the second handle being a second grip in the platter lip of the second platter end section.

In various embodiments the dorsal platter surface comprises a fluid receiving indentation section, the fluid receiving indentation section being surrounded by the platter lip of the dorsal platter surface with sloping sides of the cutting board connecting the fluid receiving indentation section of the dorsal platter surface with the platter lip of the dorsal platter surface.

In some embodiments the dorsal cutting board surface comprises a plurality of dorsal drainage holes, and the ventral cutting board surface comprises a plurality of ventral outflows, each of the plurality of ventral outflows corresponding to each of the plurality of dorsal drainage holes.

In various embodiments the dorsal cutting board surface further comprises an indentation for trapping juices.

In some embodiments the indentation for trapping juices comprises one third of a surface area of the dorsal cutting board surface and a plurality of dorsal drainage holes comprise two thirds of the surface area of the dorsal cutting board surface.

In various embodiments the first cutting board end section and second cutting board end section comprise divots, the divots enabling a user to easily grip and lift the cutting board.

In some embodiments the dorsal cutting board surface further comprises sloping sides to the ventral cutting board surface, the sloping sides seamlessly fitting to the platter lip of the platter enabling the ventral cutting board surface seamlessly engaging with the dorsal platter surface to form the serving platter system for grill to table convenience.

In various embodiments the ventral cutting board surface further comprises a plurality of support feet, the plurality of support feet separating the dorsal platter surface and the ventral cutting board surface enabling collection of juices in a fluid receiving indentation section of the dorsal platter surface.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 5A is a dorsal perspective view of a platter and a cutting board seamlessly engaging for the serving platter system for grill to table convenience according to various embodiments of the present technology.

FIG. 5B is a ventral perspective view of a platter and a cutting board separated before seamlessly engaging for the serving platter system for grill to table convenience according to various embodiments of the present technology.

DESCRIPTION OF EXEMPLARY EMBODIMENTS

Embodiments of the present disclosure are directed to serving platter systems. More particularly, to serving platter systems for grill to table convenience.

While a rounded rectangle shape is shown for a serving platter and a cutting board used for serving platter systems for grill to table convenience, a rounded rectangle shape, a disk shape, an ellipse shape, a stadium shape, and an oval shape, just to name a few shapes, are used in various embodiments.

A user, a chef, and a host, just to name a few, desire to vary the amount of juices from cut grilled food items. Various embodiments of the present technology allow a user, a chef, a host, and the like to vary the juices from cut grilled food items using serving platter systems for grill to table convenience shown in the present technology. These and other advantages of serving platter systems of the present disclosure are described in greater detail herein with respect to the collective drawings.

Figure 1:
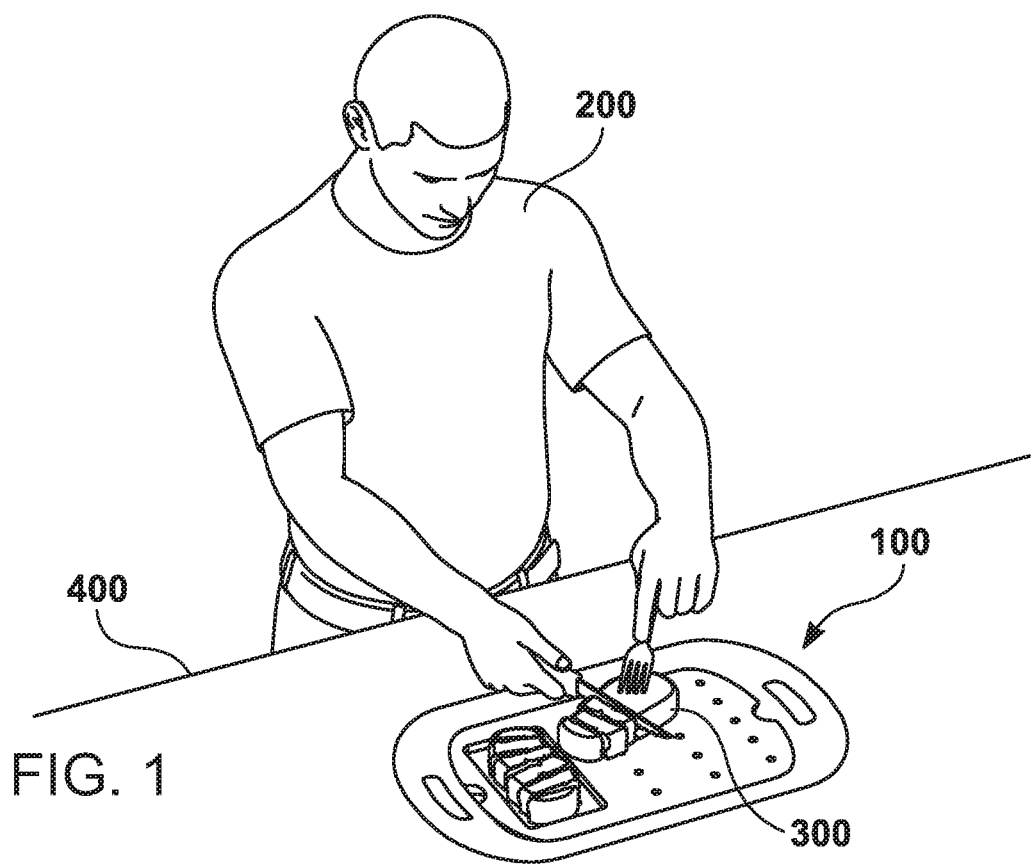
FIG. 1 is a perspective view of an exemplary serving platter system for grill to table convenience according to various embodiments of the present technology.

FIG. 1 is a perspective view of an exemplary serving platter system for grill to table convenience according to various embodiments of the present technology. FIG. 1 shows a user 200 using a serving platter system 100 for grill to table convenience including an uncut grilled food item 300 (e.g., steak). The serving platter system 100 for grill to table convenience is illustrated on a supporting surface 400. The user 200 may be a food preparer, a chef, a host, and the like. The uncut grilled food item 300 (e.g., steak) may be pork roast, sausage, or any grill item with juices in various embodiments. The supporting surface 400 may be a counter top, a table top, a grill platform built into a gas barbecue, and the like.

Figure 2:
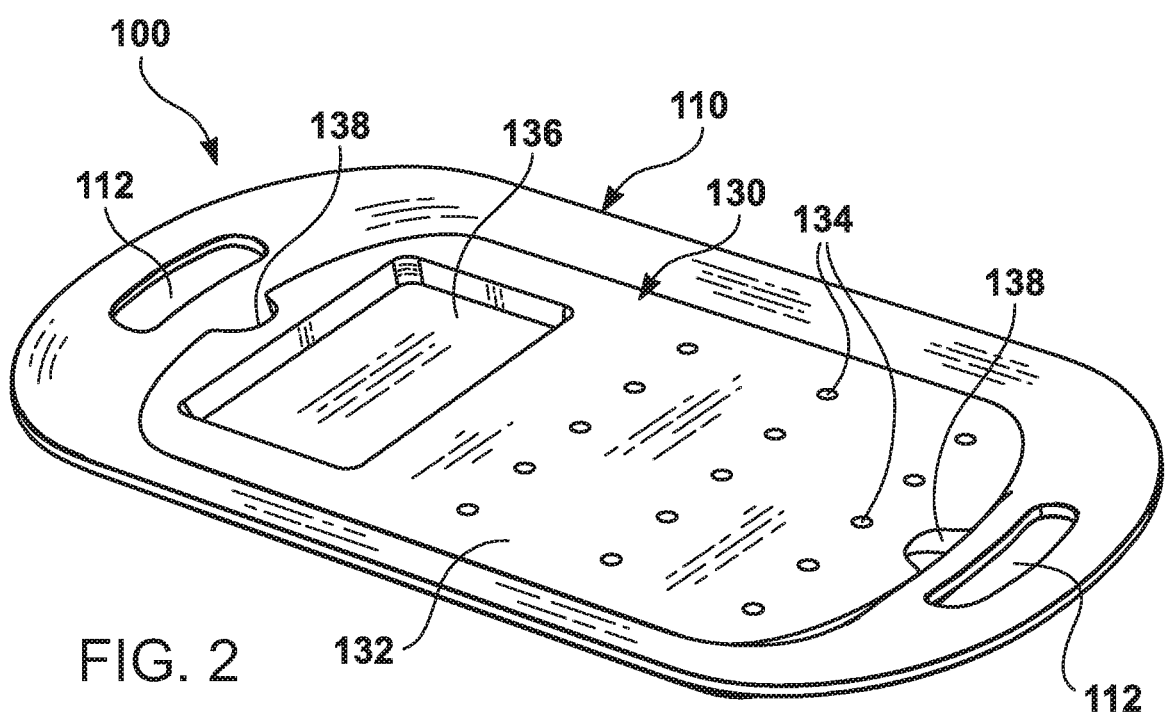
FIG. 2 is a dorsal perspective view of a platter of the serving platter system for grill to table convenience according to various embodiments of the present technology.

FIG. 2 is a dorsal perspective view of a platter of the serving platter system for grill to table convenience according to various embodiments of the present technology. FIG. 2 shows the serving platter system 100 for grill to table convenience including a platter 110 and a cutting board 130. The platter 110 comprises a first handle and a second handle 112. The cutting board 130 comprises a dorsal cutting board surface 132, a plurality of dorsal drainage holes 134, an indentation for trapping juices 136, and divots 138.

Figure 3:
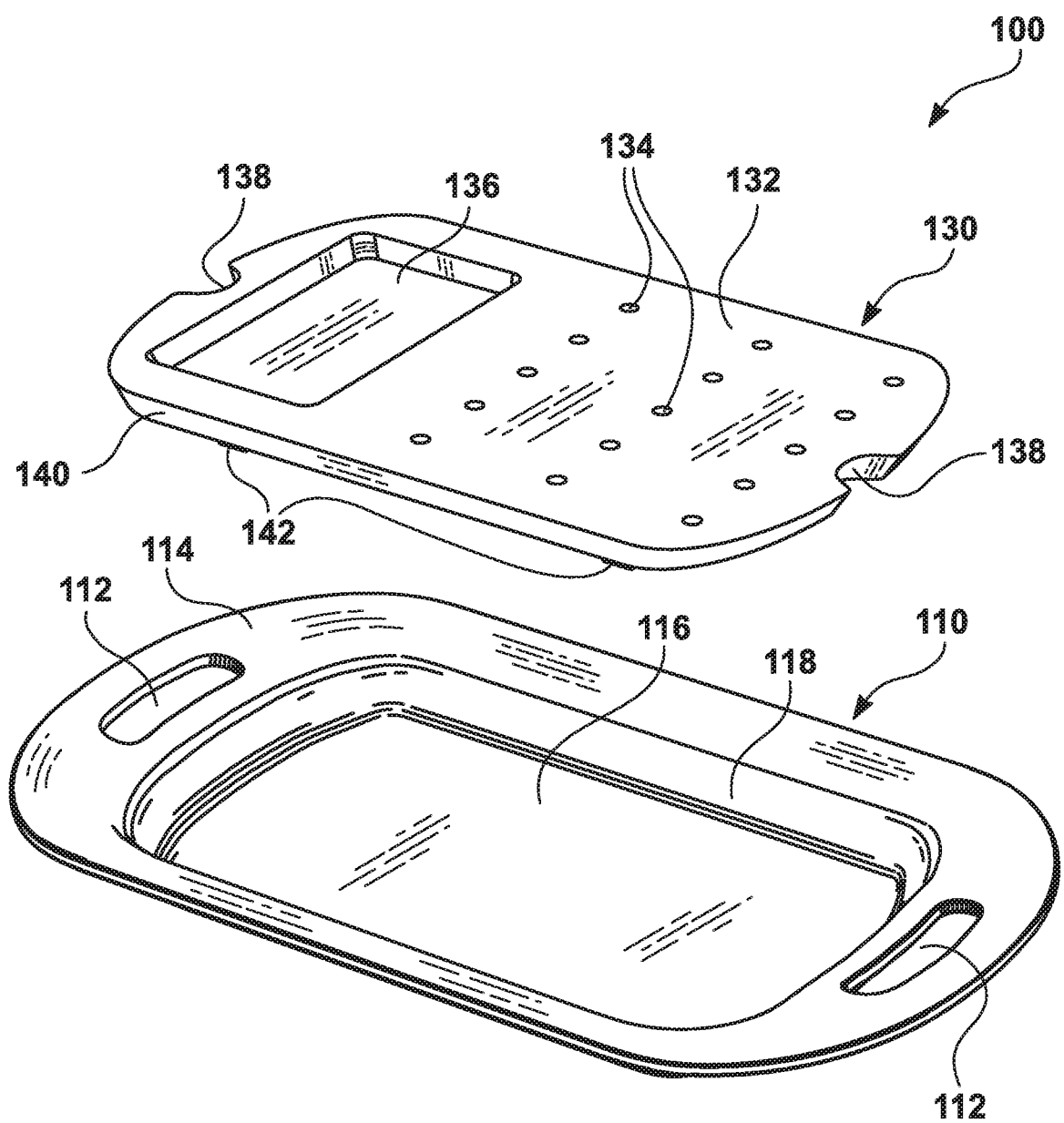
FIG. 3 is a dorsal perspective view of a platter and a cutting board of the serving platter system for grill to table convenience according to various embodiments of the present technology.

FIG. 3 is a dorsal perspective view of a platter and a cutting board of the serving platter system for grill to table convenience according to various embodiments of the present technology. FIG. 3 shows the serving platter system 100 for grill to table convenience including the platter 110 and the cutting board 130. The cutting board 130 comprises the dorsal cutting board surface 132, the plurality of dorsal drainage holes 134, the indentation for trapping juices 136, and the divots 138. The cutting board 130 further comprises sloping sides 140 and feet 142. The platter 110 comprises the first handle and the second handle 112, a platter lip 114, a fluid receiving indentation section 116, and sloping sides 118.

Figure 4:
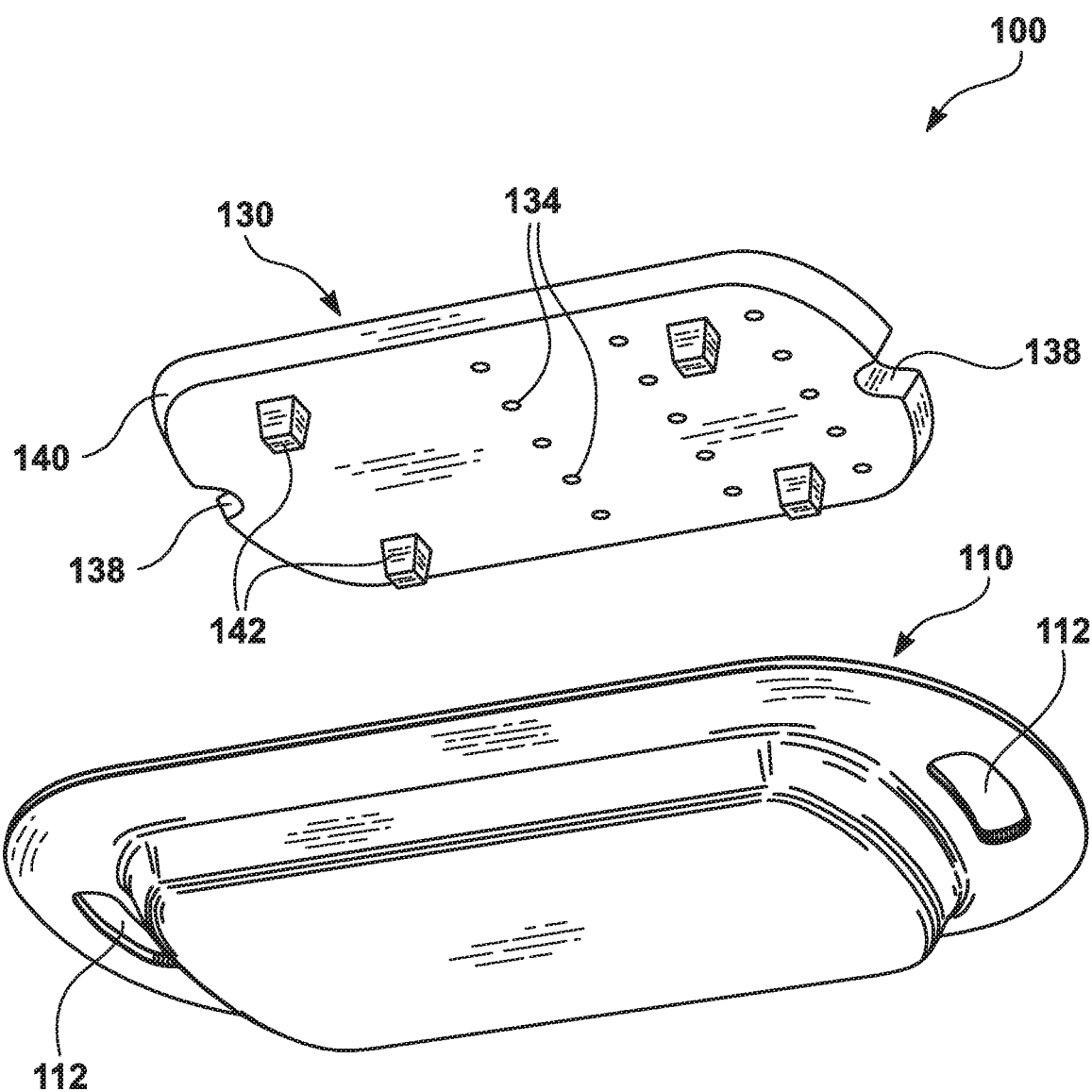
FIG. 4 is a ventral perspective view of a platter and a cutting board of the serving platter system for grill to table convenience according to various embodiments of the present technology.

FIG. 4 is a ventral perspective view of a platter and a cutting board of the serving platter system for grill to table convenience according to various embodiments of the present technology. FIG. 4 shows the cutting board 130 comprising the plurality of dorsal drainage holes 134, the divots 138, the sloping sides 140 and the feet 142. FIG. 4 shows the platter 110 comprising the first handle and the second handle 112.

FIG. 5A a dorsal perspective view of a platter and a cutting board seamlessly engaging for the serving platter system for grill to table convenience without an indentation for trapping juices on the cutting board according to various embodiments of the present technology. FIG. 5A shows a cutting board without an indentation for trapping juices on the cutting board 150 comprising the dorsal cutting board surface 132 and the plurality of dorsal drainage holes 134. Specifically, the serving platter system 100 for grill to table convenience illustrated in FIG. 5A shows the cutting board without an indentation for trapping juices on the cutting board 150 according to various embodiments. Furthermore, a dorsal view of the platter 110 is illustrated.

FIG. 5B a ventral perspective view of a platter and a cutting board separated before seamlessly engaging for the serving platter system for grill to table convenience without an indentation for trapping juices on the cutting board according to various embodiments of the present technology. The cutting board without an indentation for trapping juices on the cutting board 150 is shown with the plurality of dorsal drainage holes 134. Specifically, the serving platter system 100 for grill to table convenience is illustrated with the cutting board without an indentation for trapping juices on the cutting board 150 according to various embodiments. Furthermore, a ventral view of the platter 110 is illustrated.

Figure 6:
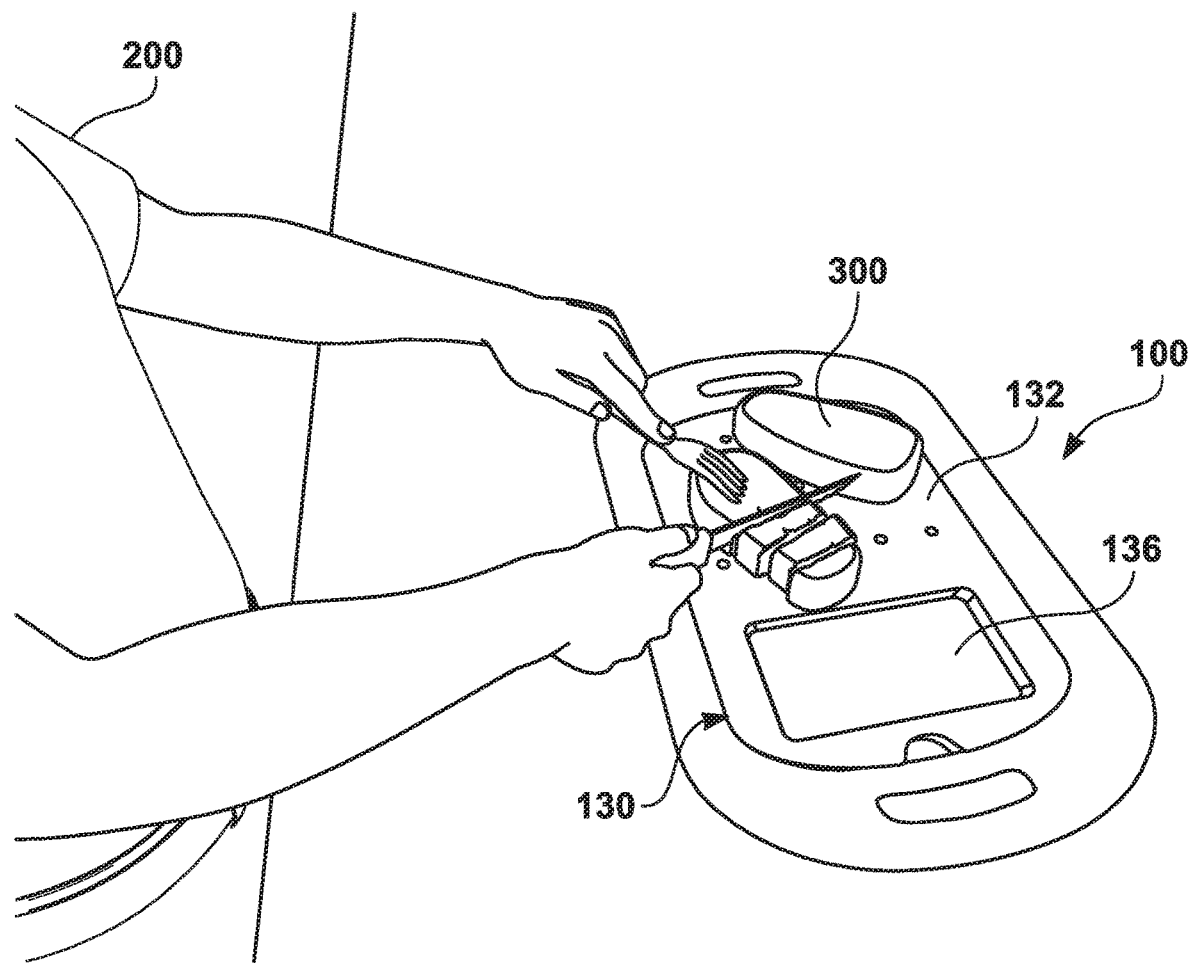
FIG. 6 is a dorsal perspective view of a platter and a cutting board seamlessly engaging for the serving platter system for grill to table convenience including an uncut grilled food item on the dorsal cutting board surface according to various embodiments of the present technology.

FIG. 6 a dorsal perspective view of a platter and a cutting board seamlessly engaging for the serving platter system for grill to table convenience including an uncut grilled food item on the dorsal cutting board surface according to various embodiments of the present technology. FIG. 6 shows the serving platter system 100 for grill to table convenience comprising the dorsal cutting board surface 132, and the indentation for trapping juices 136. Furthermore, an uncut grilled food item 300 (e.g., a steak) is shown on the dorsal cutting board surface 132 with the user 200 beginning to cut the grilled food items.

Figure 7:
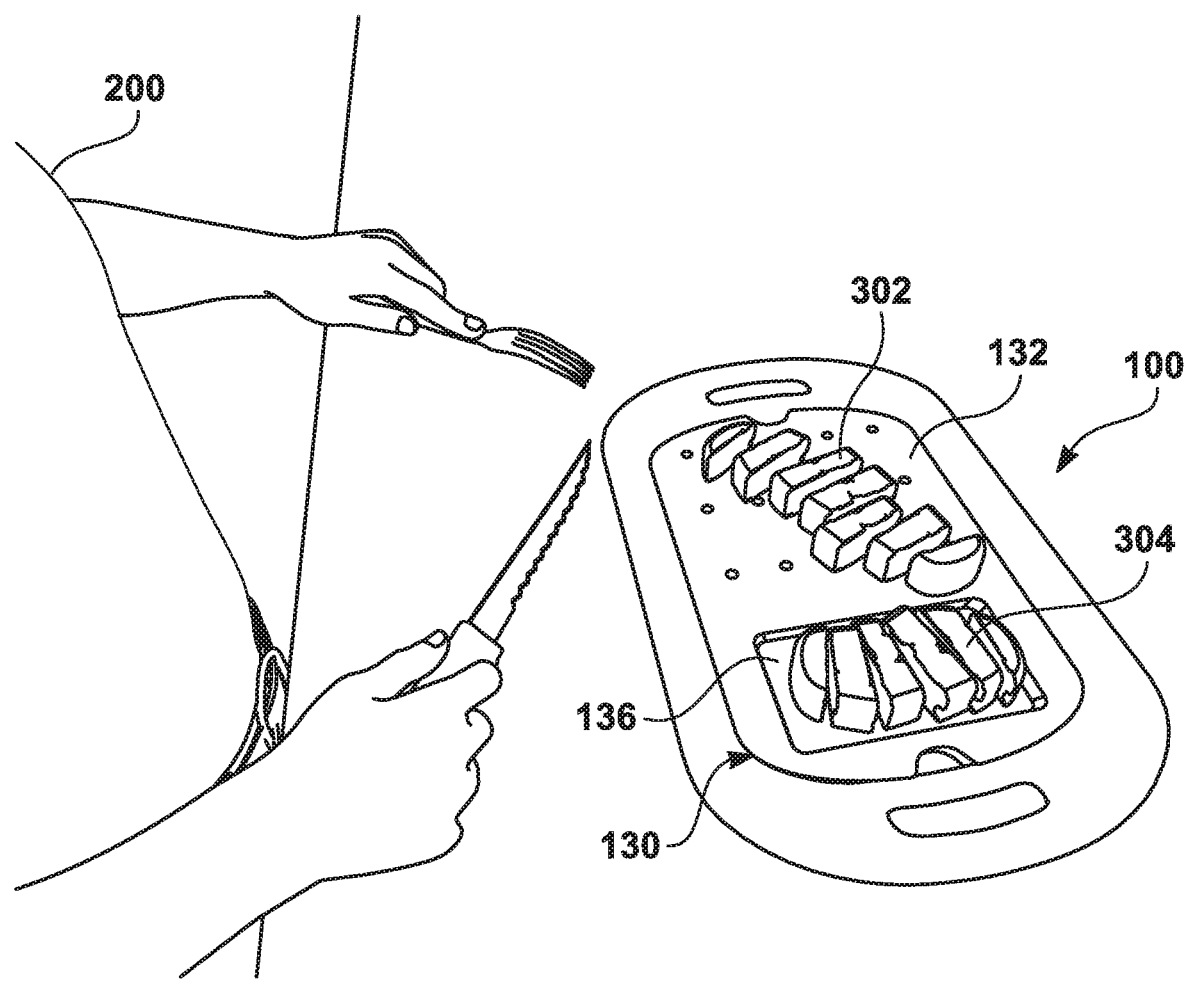
FIG. 7 is a dorsal perspective view of a platter and a cutting board seamlessly engaging for the serving platter system for grill to table convenience including a cut grilled food item on the dorsal cutting board surface and a cut grilled food item on the dorsal cutting board surface according to various embodiments of the present technology.

FIG. 7 is a dorsal perspective view of a platter and a cutting board seamlessly engaging for the serving platter system for grill to table convenience including a cut grilled food item on the dorsal cutting board surface and a cut grilled food item on the dorsal cutting board surface according to various embodiments of the present technology. FIG. 7 shows the user 200 has cut the grilled food items and moved them to different sections of the serving platter system 100 for grill to table convenience. FIG. 7 illustrates the serving platter system 100 for grill to table convenience comprising the dorsal cutting board surface 132, and a cut grilled food item 304 (e.g., cut steak) in the indentation for trapping juices 136. The cut grilled food item 302 is shown on the dorsal cutting board surface 132.

Figure 8:
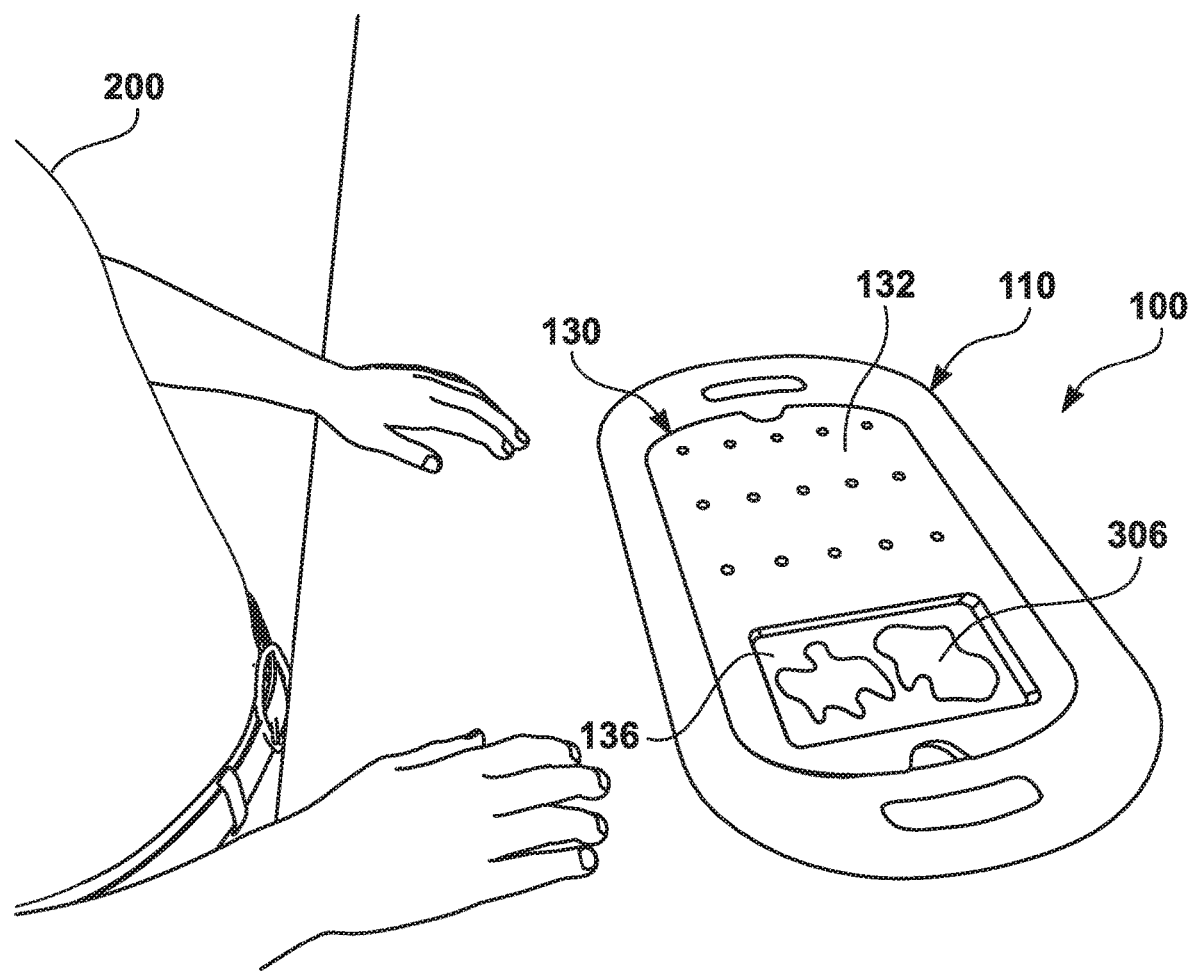
FIG. 8 is a dorsal perspective view of a platter and a cutting board seamlessly engaging for the serving platter system for grill to table convenience including juices from a cut grilled food item according to various embodiments of the present technology.

FIG. 8 illustrates a dorsal perspective view of a platter and a cutting board seamlessly engaging for the serving platter system for grill to table convenience including juices from a cut grilled food item according to various embodiments of the present technology. FIG. 8 shows the user 200 has removed the cut grilled food items from the serving platter system 100 for grill to table convenience but juices remain. FIG. 8 illustrates the serving platter system 100 for grill to table convenience comprising the platter 110 and the cutting board 130. The cutting board 130 includes the dorsal cutting board surface 132 with juices 306 from cut grilled food item (e.g., cut steak) in the indentation for trapping juices 136.

Figure 9A:
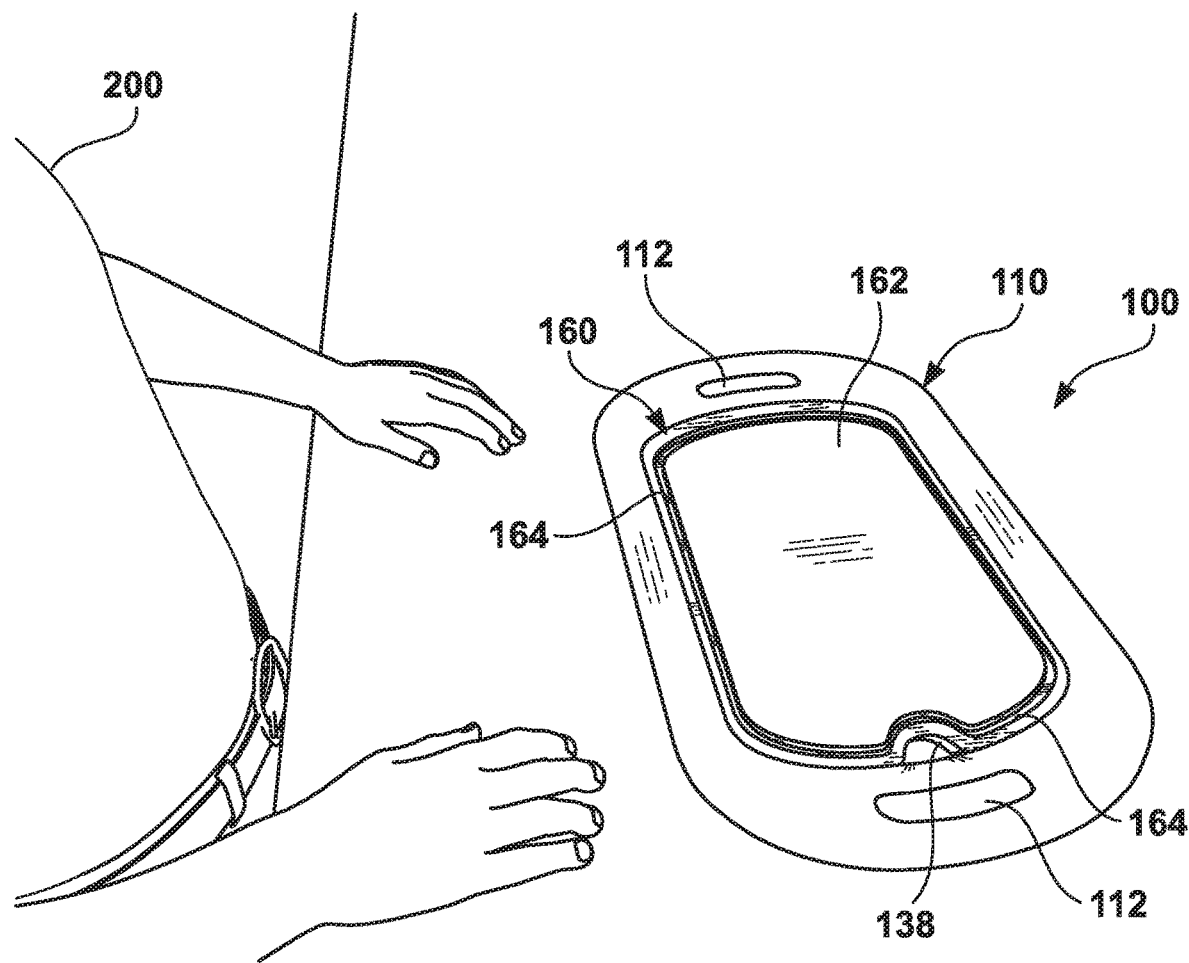
FIG. 9A is a dorsal perspective view of a platter and a cutting board seamlessly engaging for the serving platter system for grill to table convenience including a juice groove for collecting juices from a cut grilled food item on the cutting board and an end divot according to various embodiments of the present technology.

FIG. 9A is a dorsal perspective view of a platter and a cutting board seamlessly engaging for the serving platter system for grill to table convenience including a juice groove for collecting juices from a cut grilled food item on the cutting board and an end divot according to various embodiments of the present technology. FIG. 9A shows the platter 110 comprising the first handle and the second handle 112. FIG. 9A further illustrates the user 200 with the serving platter system 100 for grill to table convenience comprising the platter 110 and a flat cutting board 160 with a flat dorsal cutting board surface 162. The flat dorsal cutting board surface 162 comprises a juice groove 164 and divots 138 (divots 138 being a single end divot in FIG. 9A). The juice groove 164 may be a juice trough, a juice moat, a juice trench, a juice canal, and the like. The juice groove 164 may be any feature that enables the trapping of juices on the flat dorsal cutting board surface 162. In contrast to the dorsal cutting board surface 132 with juices 306 from cut grilled food item (e.g., cut steak) in the indentation for trapping juices 136 of FIG. 8, the flat dorsal cutting board surface 162 comprises the juice groove 164 for collecting juices in FIG. 9A. The divots 138 (divots 138 being a single end divot in FIG. 9A) may be used by the user 200 to separate the flat cutting board 160 and the platter 110. As shown in FIG. 9A, the flat dorsal cutting board surface 162 may comprise the juice groove 164 for trapping juices from a food item, the juice groove 164 being around the perimeter of the flat dorsal cutting board surface 162 according to various embodiments. For example, the juice groove 164 for trapping juices from a food item may follow the perimeter of flat dorsal cutting board surface 162. In some embodiments the divots 138 (divots 138 being a single end divot in FIG. 9A) comprises an aperture through flat dorsal cutting board surface 162 used to separate a flat cutting board 160 and the platter 110.

Figure 9B:
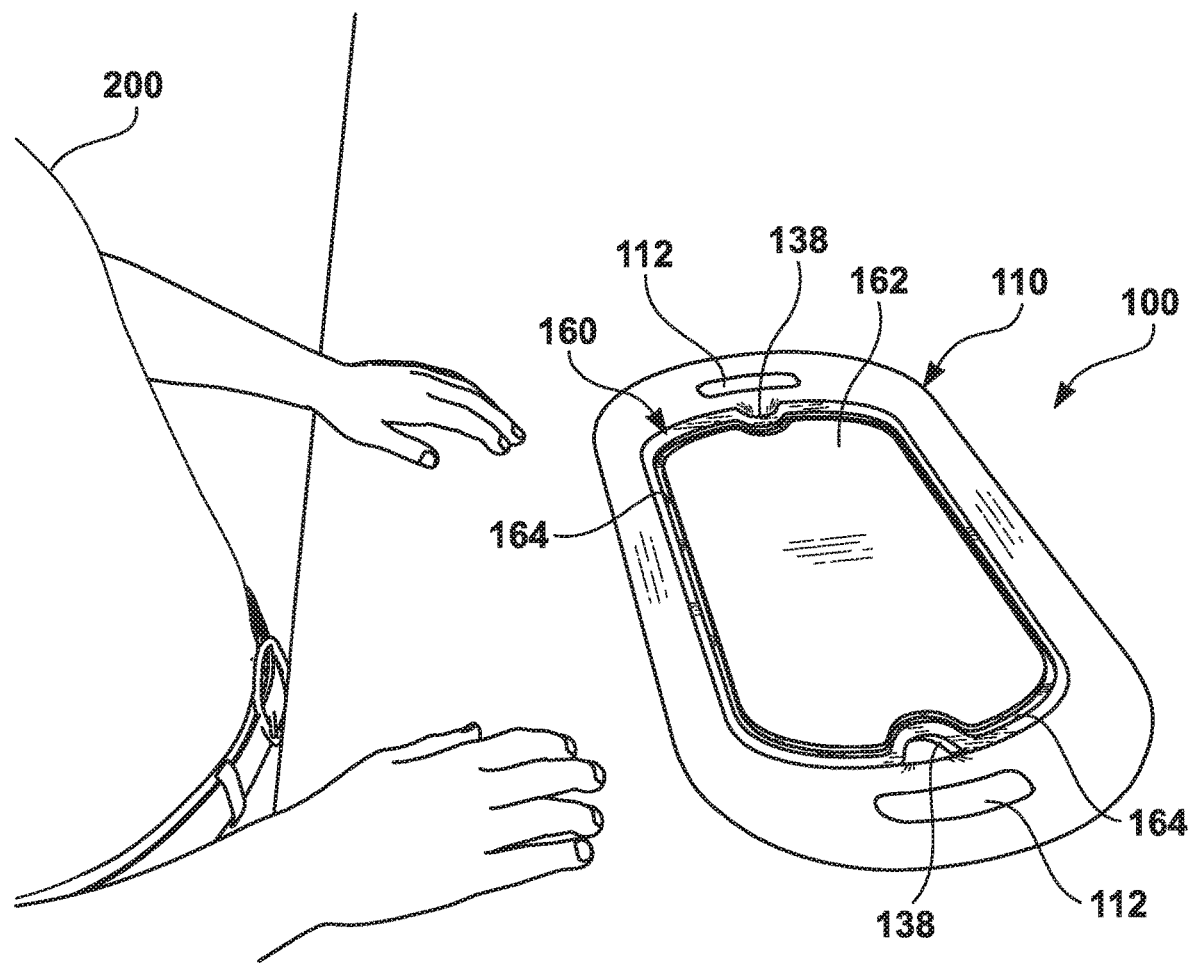
FIG. 9B is a dorsal perspective view of a platter and a cutting board seamlessly engaging for the serving platter system for grill to table convenience including a juice groove for collecting juices from a cut grilled food item on the cutting board and end divots according to various embodiments of the present technology.

FIG. 9B is a dorsal perspective view of a platter and a cutting board seamlessly engaging for the serving platter system for grill to table convenience including a juice groove for collecting juices from a cut grilled food item on the cutting board and end divots according to various embodiments of the present technology. In contrast to the flat dorsal cutting board surface 162 of FIG. 9A (divots 138 being a single end divot in FIG. 9A), the flat dorsal cutting board surface 162 of FIG. 9B comprises an divots 138 (divots 138 being an end divot on both ends in FIG. 9B). FIG. 9B shows the platter 110 comprising the first handle and the second handle 112. FIG. 9B further illustrates the user 200 with the serving platter system 100 for grill to table convenience comprising the platter 110 and a flat cutting board 160 with a flat dorsal cutting board surface 162. The flat dorsal cutting board surface 162 comprises a juice groove 164 and divots 138 (divots 138 being an end divot on both ends in FIG. 9B). The juice groove 164 may be a juice trough, a juice moat, a juice trench, a juice canal, and the like. The juice groove 164 may be any feature that enables the trapping of juices on the flat dorsal cutting board surface 162. In contrast to the dorsal cutting board surface 132 with juices 306 from cut grilled food item (e.g., cut steak) in the indentation for trapping juices 136 of FIG. 8, the flat dorsal cutting board surface 162 comprises the juice groove 164 for collecting juices in FIG. 9B. The divots 138 (divots 138 being an end divot on both ends in FIG. 9B) may be used by the user 200 to separate the flat cutting board 160 and the platter 110. As shown in FIG. 9B, the flat dorsal cutting board surface 162 may comprise the juice groove 164 for trapping juices from a food item, the juice groove 164 being around the perimeter of the flat dorsal cutting board surface 162 according to various embodiments. For example, the juice groove 164 for trapping juices from a food item may follow the perimeter of flat dorsal cutting board surface 162. In some embodiments the divots 138 (divots 138 being an end divot on both ends in FIG. 9B) comprises an aperture through flat dorsal cutting board surface 162 used to separate a flat cutting board 160 and the platter 110.

Figure 10A:
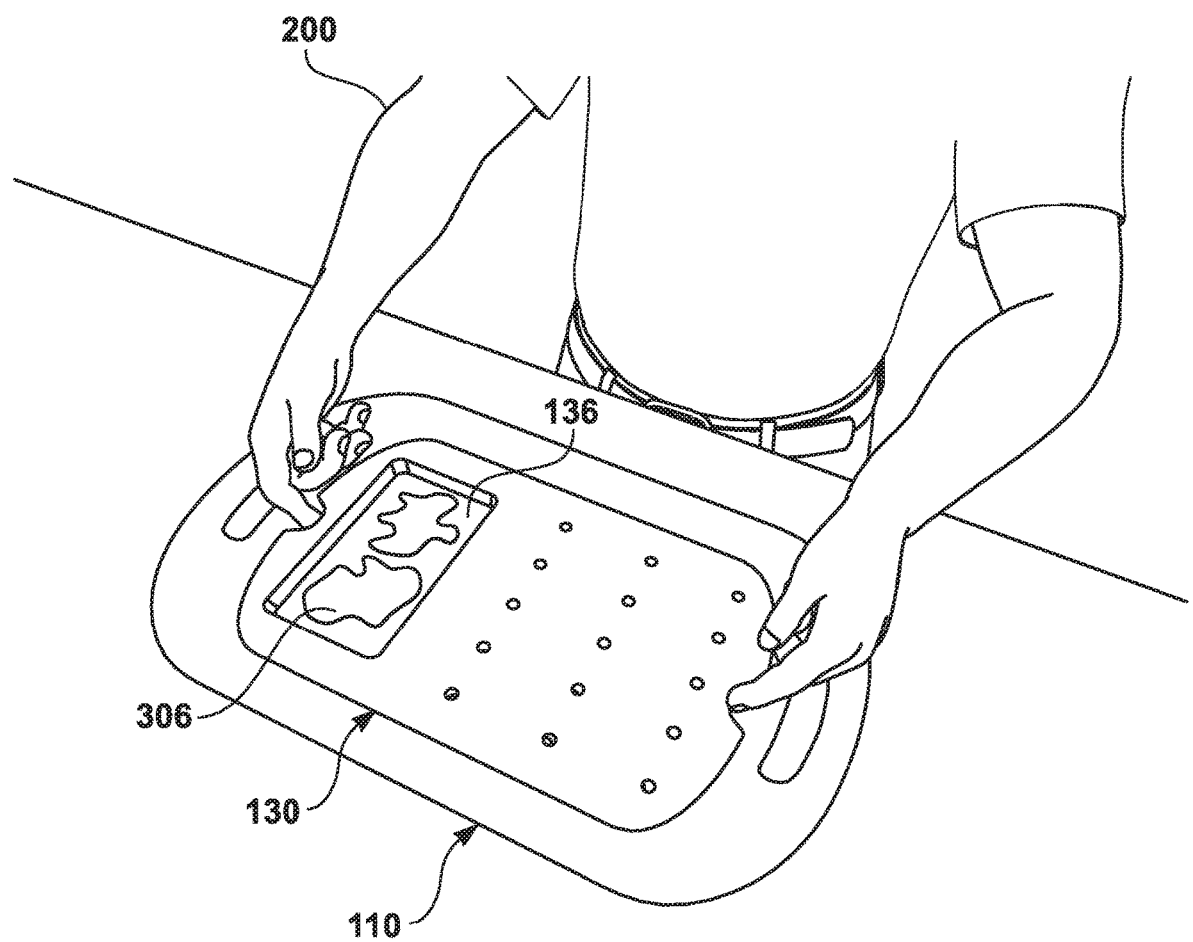
FIG. 10A is a dorsal perspective view of a platter and a cutting board seamlessly engaging for the serving platter system for grill to table convenience a user engaging the divots on the cutting board according to various embodiments of the present technology.

FIG. 10A illustrates a dorsal perspective view of a platter and a cutting board seamlessly engaging for the serving platter system for grill to table convenience with a user engaging the divots on the cutting board according to various embodiments of the present technology. FIG. 10A shows the user 200 engaging the divots on the cutting board 130 to access the fluid receiving indentation section 116 of the platter 110 (not visible). FIG. 10A shows the platter 110 and the cutting board 130. The cutting board 130 comprises the juices 306 from cut grilled food item (e.g., cut steak) in the indentation for trapping juices 136.

Figure 10B:
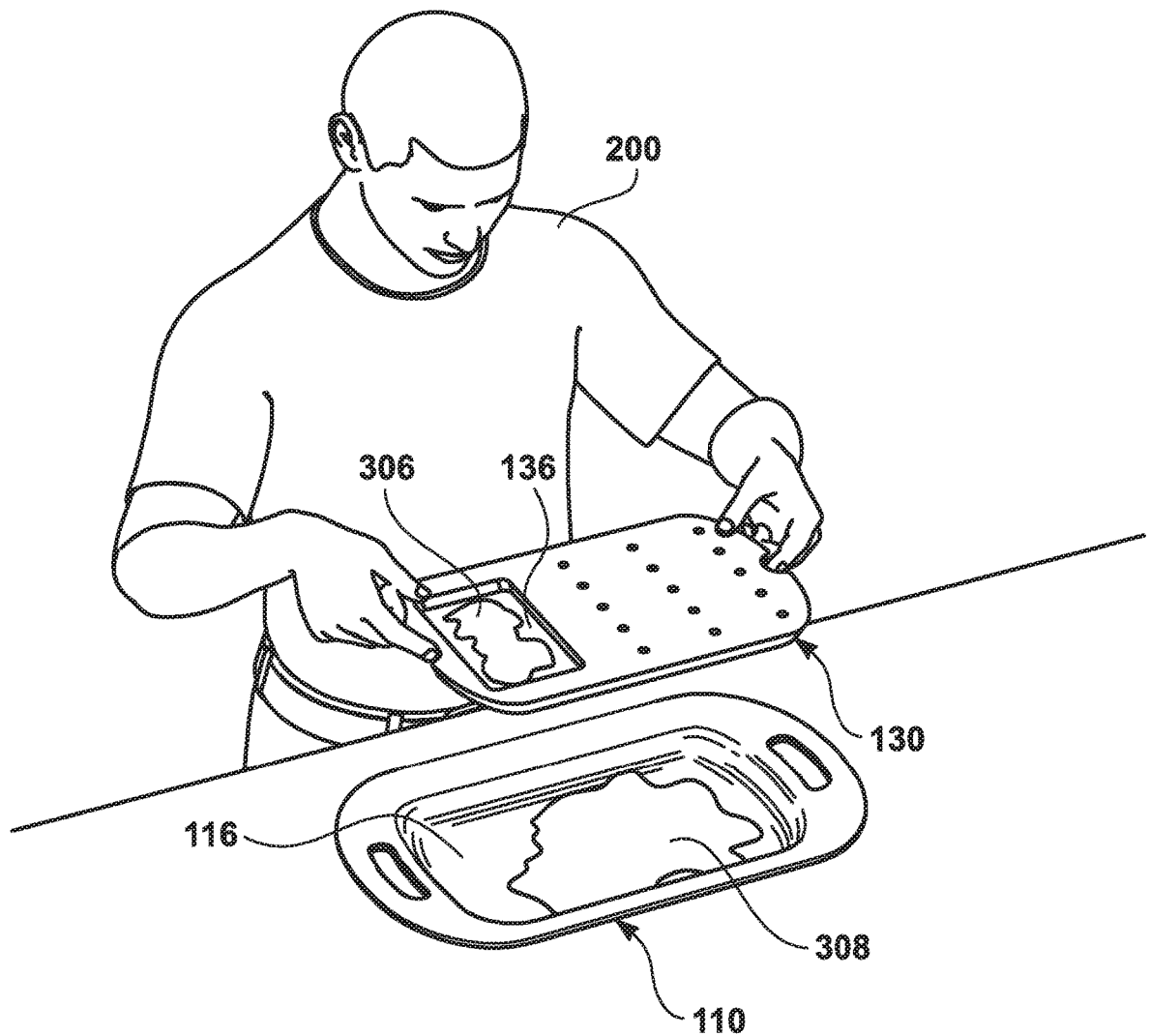
FIG. 10B is a dorsal perspective view of a platter and a cutting board separated for the serving platter system for grill to table convenience a user engaging the divots on the cutting board to show juices from cut grilled food item in the fluid receiving indentation section of the platter according to various embodiments of the present technology.

FIG. 10B illustrates a dorsal perspective view of a platter and a cutting board separated for the serving platter system for grill to table convenience with a user engaging the divots on the cutting board to show juices from cut grilled food item in the fluid receiving indentation section of the platter according to various embodiments of the present technology. FIG. 10B shows the user 200 engaging the divots on the cutting board 130 to access the juices from cut grilled food item 308 (e.g., cut steak) in the fluid receiving indentation section 116 of the platter 110. FIG. 10B further shows the juices 306 from cut grilled food item (e.g., cut steak) in the indentation for trapping juices 136 in the cutting board.

While this technology is susceptible of embodiments in many different forms, there is shown in the drawings and has been described in detail several specific embodiments with the understanding that the present disclosure is to be considered as an exemplification of the principles of the technology and is not intended to limit the technology to the embodiments illustrated.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A serving platter system for grill to table convenience, comprising:
    a platter, comprising:
        a dorsal platter surface, the dorsal platter surface comprising:
            a first platter lateral side;
            a second platter lateral side, the first platter lateral side and the second platter lateral side being congruent;
            a first platter end section;
            a second platter end section, the first platter end section and the second platter end section being congruent;

a ventral platter surface; and
a cutting board, comprising:
   a dorsal cutting board surface, comprising:
      a juice groove for trapping juices from a food item, the juice groove following a perimeter of the dorsal cutting board surface;
      a first cutting board lateral side;
      a second cutting board lateral side, the first cutting board lateral side and the second cutting board lateral side being congruent;
      a first cutting board end section;
      a second cutting board end section, the first cutting board end section and the second cutting board end section being congruent; and
      a ventral cutting board surface, the ventral cutting board surface seamlessly engaging with the dorsal platter surface to form the serving platter system for grill to table convenience.

2. The serving platter system for grill to table convenience of claim 1, wherein the dorsal platter surface further comprises a platter lip, the platter lip surrounding the first platter lateral side, the second platter lateral side, the first platter end section, and the second platter end section.

3. The serving platter system for grill to table convenience of claim 2,
wherein, the first platter end section and the second platter end section further comprise a first handle and a second handle, the first handle being a first grip in the platter lip of the first platter end section, and the second handle being a second grip in the platter lip of the second platter end section.

4. The serving platter system for grill to table convenience of claim 2, wherein the dorsal platter surface comprises a fluid receiving indentation section, the fluid receiving indentation section being surrounded by the platter lip of the dorsal platter surface with sloping sides of the cutting board connecting the fluid receiving indentation section with the platter lip of the dorsal platter surface.

5. The serving platter system for grill to table convenience of claim 1, wherein the dorsal cutting board surface comprises a plurality of dorsal drainage holes, and the ventral cutting board surface comprises a plurality of ventral outflows, each of the plurality of ventral outflows corresponding to each of the plurality of dorsal drainage holes.

6. The serving platter system for grill to table convenience of claim 1, wherein the dorsal cutting board surface further comprises an indentation for trapping juices.

7. The serving platter system for grill to table convenience of claim 6, wherein the indentation for trapping juices comprises one third of a surface area of the dorsal cutting board surface and a plurality of dorsal drainage holes comprise two thirds of the surface area of the dorsal cutting board surface.

8. The serving platter system for grill to table convenience of claim 1, the first cutting board end section and second cutting board end section comprise divots, the divots enabling a user to easily grip and lift the cutting board.

9. The serving platter system for grill to table convenience of claim 2, wherein the dorsal cutting board surface further comprises sloping sides to the ventral cutting board surface, the sloping sides seamlessly fitting to the platter lip of the platter enabling the ventral cutting board surface seamlessly engaging with the dorsal platter surface to form the serving platter system for grill to table convenience.

10. The serving platter system for grill to table convenience of claim 4, wherein the ventral cutting board surface further comprises a plurality of support feet, the plurality of support feet separating the dorsal platter surface and the ventral cutting board surface enabling collection of juices in the fluid receiving indentation section of the dorsal platter surface.

11. A method for manufacturing a serving platter system, the method comprising:
forming a platter, the platter comprising:
   a dorsal platter surface, the dorsal platter surface comprising:
      a first platter lateral side;
      a second platter lateral side, the first platter lateral side and the second platter lateral side being congruent;
      a first platter end section;
      a second platter end section, the first platter end section and the second platter end section being congruent; and
      a platter lip, the platter lip surrounding the first platter lateral side, the second platter lateral side, the first platter end section, and the second platter end section;
   a ventral platter surface; and
forming a cutting board, the cutting board comprising:
   a dorsal cutting board surface, comprising:
      a juice groove for trapping juices from a food item, the juice groove following a perimeter of the dorsal cutting board surface;
      a first cutting board lateral side;
      a second cutting board lateral side, the first cutting board lateral side and the second cutting board lateral side being congruent;
      a first cutting board end section;
      a second cutting board end section, the first cutting board end section and the second cutting board end section being congruent;
      sloping sides to a ventral cutting board surface, the sloping sides seamlessly fitting to the platter lip of the platter enabling the ventral cutting board surface seamlessly engaging with the dorsal platter surface to form the serving platter system for grill to table convenience; and
      a ventral cutting board surface, the ventral cutting board surface seamlessly engaging with the dorsal platter surface to form the serving platter system.

12. The method of claim 11, wherein the first platter end section and the second platter end section further comprise a first handle and a second handle, the first handle being a first grip in the platter lip of the first platter end section, and the second handle being a second grip in the platter lip of the second platter end section.

13. The method of claim 11, wherein the dorsal platter surface comprises a fluid receiving indentation section, the fluid receiving indentation section being surrounded by the platter lip of the dorsal platter surface with sloping sides of the cutting board connecting the fluid receiving indentation section of the dorsal platter surface with the platter lip of the dorsal platter surface.

14. The method of claim 11, wherein the dorsal cutting board surface comprises a plurality of dorsal drainage holes, and the ventral cutting board surface comprises a plurality of ventral outflows, each of the plurality of ventral outflows corresponding to each of the plurality of dorsal drainage holes.

15. The method of claim 11, wherein the dorsal cutting board surface further comprises a juice groove for trapping juices from a food item, the juice groove being around the perimeter of the dorsal cutting board surface.

16. The method of claim 11, wherein the dorsal cutting board surface further comprises an end divot, the end divot comprising an aperture through the dorsal cutting board surface used to separate the cutting board and the platter.

17. The method of claim 11, wherein forming the platter and/or cutting board includes any of three-dimensional printing, laser cutting, computer numerical control routing, milling, pressing, stamping, vacuum forming, hydroforming, or injection molding.

18. The method of claim 11, the platter and/or cutting board being composed of a metal, a mineral, a ceramic, a glass, a glass ceramic, a wood, a rubber, a composite material, or a biomaterial and/or any combinations thereof.

19. A method for manufacturing a serving platter system, the method comprising:

forming a platter, the platter comprising:
 a dorsal platter surface, the dorsal platter surface comprising:
  a first platter lateral side;
  a second platter lateral side, the first platter lateral side and the second platter lateral side being congruent;
  a first platter end section;
  a second platter end section, the first platter end section and the second platter end section being congruent; and
  a platter lip, the platter lip surrounding the first platter lateral side, the second platter lateral side, the first platter end section, and the second platter end section;
 sloping sides to a ventral cutting board surface, the sloping sides seamlessly fitting to the platter lip of the platter enabling the ventral cutting board surface seamlessly engaging with the dorsal platter surface to form the serving platter system for grill to table convenience; and
 a ventral platter surface; and forming a cutting board, the cutting board comprising:
 a dorsal cutting board surface, comprising:
  a first cutting board lateral side;
  a second cutting board lateral side, the first cutting board lateral side and the second cutting board lateral side being congruent;
  a first cutting board end section;
  a second cutting board end section, the first cutting board end section and the second cutting board end section being congruent;
 the ventral cutting board surface, the ventral cutting board surface seamlessly engaging with the dorsal platter surface to form the serving platter system for grill to table convenience; and
 a plurality of support feet, the plurality of support feet separating the dorsal platter surface and the ventral cutting board surface enabling collection of juices in a fluid receiving indentation section of the dorsal platter surface.

20. The method of claim 19, wherein the dorsal cutting board surface further comprises sloping sides to the ventral cutting board surface, the sloping sides seamlessly fitting to the platter lip of the platter enabling the ventral cutting board surface seamlessly engaging with the dorsal platter surface to form the serving platter system for grill to table convenience.

21. The method of claim 19, wherein the first cutting board end section and the second cutting board end section comprise divots, the divots enabling a user to easily grip and lift the cutting board.

22. The method of claim 19, wherein the dorsal cutting board surface further comprises a juice groove for trapping juices from a food item, the juice groove being around a perimeter of the dorsal cutting board surface.

23. The method of claim 19, wherein forming the platter and/or cutting board includes any of three-dimensional printing, laser cutting, computer numerical control routing, milling, pressing, stamping, vacuum forming, hydroforming, or injection molding.

24. The method of claim 19, the platter and/or cutting board being composed of a metal, a mineral, a ceramic, a glass, a glass ceramic, a wood, a rubber, a composite material, or a biomaterial and/or any combinations thereof.

* * * * *